United States Patent
Nakatsugawa

(10) Patent No.: US 8,653,468 B2
(45) Date of Patent: Feb. 18, 2014

(54) RADIOLOGICAL IMAGE CONVERSION PANEL, METHOD OF MANUFACTURING RADIOLOGICAL CONVERSION PANEL AND RADIOLOGICAL IMAGE DETECTION APPARATUS

(75) Inventor: Haruyasu Nakatsugawa, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 50 days.

(21) Appl. No.: 13/456,883

(22) Filed: Apr. 26, 2012

(65) Prior Publication Data
US 2012/0273685 A1 Nov. 1, 2012

(30) Foreign Application Priority Data
Apr. 27, 2011 (JP) ................. 2011-099738

(51) Int. Cl.
*G01T 1/20* (2006.01)
*H01L 27/146* (2006.01)

(52) U.S. Cl.
USPC .............................. 250/370.11; 250/370.09

(58) Field of Classification Search
USPC ........................ 250/370.09, 370.11
See application file for complete search history.

(56) References Cited

U.S. PATENT DOCUMENTS

| | | | | |
|---|---|---|---|---|
| 5,029,247 A * | 7/1991 | Anno et al. | ............. | 250/214 VT |
| 2003/0002625 A1 | 1/2003 | Suzuki | | |
| 2003/0015665 A1 | 1/2003 | Suzuki et al. | | |
| 2003/0104245 A1 * | 6/2003 | Bergh et al. | .................... | 428/690 |
| 2006/0033031 A1 * | 2/2006 | Takeda et al. | ............. | 250/370.11 |
| 2007/0051896 A1 * | 3/2007 | Okada et al. | ............. | 250/370.11 |
| 2008/0035852 A1 * | 2/2008 | Nagata et al. | ............. | 250/370.11 |
| 2008/0054183 A1 | 3/2008 | Nagata et al. | | |
| 2010/0314547 A1 * | 12/2010 | Kudo et al. | .................. | 250/368 |
| 2011/0006213 A1 | 1/2011 | Sato et al. | | |
| 2011/0147602 A1 * | 6/2011 | Ishida et al. | ............. | 250/370.11 |

FOREIGN PATENT DOCUMENTS

| | | |
|---|---|---|
| JP | 06-230198 A | 8/1994 |
| JP | 2005-283483 A | 10/2005 |
| JP | 2008-008741 A | 1/2008 |
| JP | 4197593 | 10/2008 |
| JP | 4197871 | 10/2008 |
| JP | 2011-017683 A | 1/2011 |
| WO | WO 2008/029610 A1 | 3/2008 |
| WO | WO 2010/029779 A1 | 3/2010 |

* cited by examiner

*Primary Examiner* — David Porta
*Assistant Examiner* — Jeremy S Valentiner
(74) *Attorney, Agent, or Firm* — Jean C. Edwards, Esq.; Edwards Neils PLLC

(57) ABSTRACT

A radiological image conversion panel includes a phosphor and a light transmissive protection material. The phosphor has a group of columnar crystals formed by growing a crystal of a fluorescent material and a fluorescence emitting surface configured by a set of tips of the columnar crystals. The light transmissive protection material covers the fluorescence emitting surface of the phosphor. The protection material is inserted between the tips of the group of the columnar crystals. A gap is formed between at least a part of a side of the tips of the columnar crystals and the protection material. The radiological image detection apparatus includes a radiological image conversion panel and a sensor panel that is provided close to the fluorescence emitting surface of the phosphor to detect the fluorescence emitted from the phosphor.

17 Claims, 6 Drawing Sheets

RADIOLOGICAL IMAGE CONVERSION PANEL, METHOD OF MANUFACTURING RADIOLOGICAL CONVERSION PANEL AND RADIOLOGICAL IMAGE DETECTION APPARATUS

CROSS-REFERENCE TO RELATED APPLICATIONS

This application claims the benefit of Japanese Patent Application No. 2011-099738, filed on Apr. 27, 2011, the entire contents of which are hereby incorporated by reference, the same as if set forth at length; the entire of which are incorporated herein by reference.

BACKGROUND OF THE INVENTION

1. Technical Field

The present invention relates to a radiological image conversion panel, a method of manufacturing a radiological image conversion panel, and a radiological image detection apparatus equipped with the radiological image conversion panel.

2. Description of Related Art

Recently, a radiological image detection apparatus that utilizes a flat panel detector (FPD) detecting a radiological image to create digital image data has been commercialized, and is widely distributed because the image is instantly checked as compared with an imaging plate according to a related art. Various types of radiological image detectors are available and one of them is known as an indirect conversion type radiation image detector.

The indirect conversion type radiological image detection apparatus includes a scintillator (phosphor) made of a fluorescent material such as cesium iodide (CsI) that produces fluorescence by the radiation exposure and a sensor panel in which a plurality of thin film type photoelectric conversion elements are two-dimensionally arranged on a substrate. The radiation that penetrates a subject is converted into light by the scintillator of the radiological image conversion panel and the fluorescence of the scintillator is converted into an electrical signal by the photoelectric conversion elements of the sensor panel, thereby generating image data.

A technology that forms the scintillator with a group of columnar crystals that is formed by growing a crystal of a fluorescent material such as CsI by a vapor deposition method in a columnar is also known (see, for example, WO 2008/029610 A, WO 2010/029779 A and JP-A-2011-017683). The columnar crystals formed by the vapor deposition method does not contain impurities such as a bonding agent, and has a light guide effect that directs the fluorescence generated therein in a growth direction of the crystal to suppress the diffusion of the fluorescence. Therefore, not only the sensitivity of the radiological image detection apparatus, but also a sharpness of the image is improved.

In a radiological image conversion panel disclosed in WO 2008/029610 A, in order to increase the light gathering efficiency of the fluorescence, tips of individual columnar crystals are formed to be a convexed shape having a tip angle at about 40 degrees to 80 degrees.

Herein, a crystal of CsI has a deliquescent property and thus causes the columnar crystal structure collapses by absorbing moisture to reduce the light guide effect. Therefore, the scintillator formed by the columnar crystal of CsI is typically covered by a protection film made of polyparaxylylene in order to provide a moistureproofing property. The polyparaxylylene protection film is generally formed by the vapor deposition method.

The polyparaxylylene protection film formed by the vapor deposition method may be inserted into a deep portion between the columnar crystals. The light guide effect of the columnar crystal is generated by the total reflection generated by a difference in refractive indexes between the columnar crystal and the surrounding medium. Though the surrounding medium is air, if the protection film is inserted into the deep portion between the columnar crystals to cover around the columnar crystal, the refractive index of the polyparaxylylene that forms the protection film is bigger than that of air. As a result, the difference in the refractive indexes between the columnar crystal and the surrounding medium becomes small, so that the total reflection is suppressed to reduce the light guide effect as described above.

Therefore, in a radiological image conversion panel disclosed in WO 2010/029779 A, the protection film is formed by applying a gel type curable resin so that the protection film fills only between the tips of the columnar crystal group, but does not reach the deep portion between the columnar crystals.

SUMMARY

The radiological image conversion panel is generally bonded to a sensor panel by closely attaching a scintillator to a light receiving surface of the sensor panel in which photoelectric conversion elements are two-dimensionally arranged. When the radiological image conversion panel is bonded to the sensor panel, a load is applied to the tip of the columnar crystal. When using a radiological image detection apparatus configured by bonding a radiological image conversion panel and a sensor panel, a load such as a weight of a patient is applied to the radiological image detection apparatus so that the load may be applied to the tip of the columnar crystal as well. When the load is applied to the tip of the columnar crystal, the tip may be damaged or deformed, which may result in reducing the light gathering efficiency of the fluorescence and deteriorating the sharpness of the image due to the diffusion of the fluorescence.

As in a radiological image conversion panel disclosed in WO 2010/029779 A, the deformation of the tips of the columnar crystal may be prevented by filling a gap between tips of a columnar crystal group with resin. However, since the refractive index of the resin is larger than that of air, the reducing of the light guide effect using the total reflection generated by the difference in the refractive indexes may not be avoided so that the sharpness of the image may also be lowered.

The present invention has been made in an effort to provide a radiological image conversion panel and a radiological image detection apparatus having an excellent image quality and durability.

(1) A radiological image conversion panel includes a phosphor and a light transmissive protection material. The phosphor includes a group of columnar crystals and a fluorescence emitting surface. The columnar crystal is formed by growing a crystal of a fluorescent material which emits fluorescence in a columnar by a radiation exposure. The fluorescence emitting surface is configured by a set of tips of the columnar crystals. The light transmissive protection material covers the fluorescence emitting surface of the phosphor. The protection material is inserted between the tips of the group of the columnar crystals. A gap is formed between at least a part of a side of the tips of the columnar crystals and the protection material.

(2) A manufacturing method for a radiological image conversion panel that includes a phosphor having a group of columnar crystals formed by growing a crystal of a fluorescent material which emits fluorescence in a columnar by a radiation exposure and including a fluorescence emitting surface configured by a set of tips of the columnar crystals, the method including: heating the phosphor; covering the fluorescence emitting surface of the heated phosphor with a protection material having a smaller coefficient of linear expansion than a coefficient of linear expansion of the fluorescent material to harden the protection material in a state where the tips of the columnar crystal are inserted in the protection material; and cooling the phosphor and the protection material after hardening the protection material.

(3) A radiological image detection apparatus includes a radiological image conversion panel of claim 1, and a sensor panel. The sensor panel is provided closely attached to the fluorescence emitting surface of the phosphor to detect the fluorescence emitted from the phosphor.

According to the present invention, the protective material is inserted between the tips of the columnar crystal to fill the gaps between the tips, which results in suppressing the deformation of the tip of the columnar crystal and improving durability. Since a void is present between the protective material and the side of the tip of the columnar crystal, the light guide effect caused by the total reflection generated by the difference in refractive indexes is maintained at the tips. Therefore, it is possible to prevent the sharpness of the image from being lowered, thereby improving the image quality.

DETAILED DESCRIPTION OF EMBODIMENTS OF THE INVENTION

Figure 1:
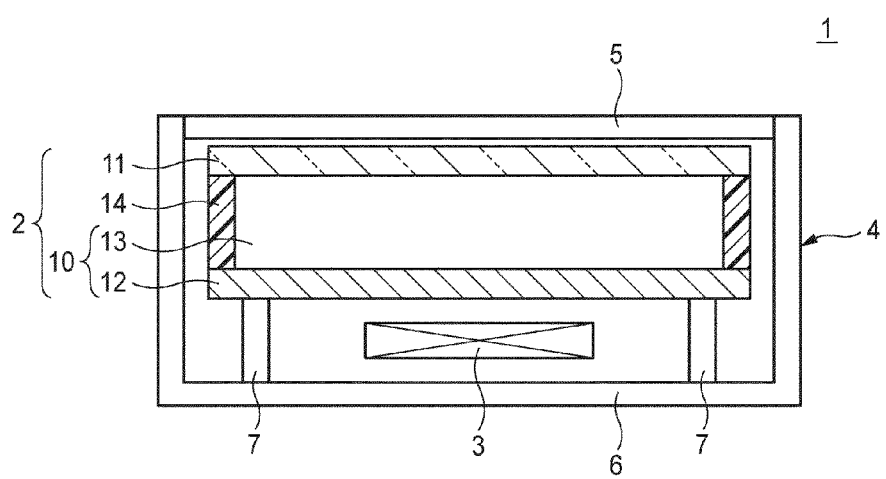
FIG. 1 is a diagram schematically illustrating the configuration of a radiological image detection apparatus according to an exemplary embodiment of the present invention.

FIG. 1 illustrates the configuration of a radiological image detection apparatus according to an exemplary embodiment of the present invention.

A radiological image detection apparatus 1 shown in FIG. 1 is a transportable type device (hereinafter, referred to as a cassette). The cassette 1 includes a detecting module 2 that detects a radiological image, a control module 3 that controls an operation of the detecting module 2 and generates an image based on the radiological image detected by the detecting module 2, and a case 4 that accommodates the detecting module 2 and the control module 3.

In the case 4, a subject (e.g., a capturing target of a patient) is loaded on an upper plate 5 that is overlapped with the detecting module 2, and the radiation, which is irradiated toward the subject, penetrates the upper plate 5 to be incident into the detecting module 2. The upper plate 5 is formed of a material having a low radiation absorbing power, typically, carbon fiber reinforced plastic (CFRP) or aluminum.

In the example shown in the drawing, the detecting module 2 is supported by a plurality of ribs 7 erectly provided on a floor 6 of the case 4. In the meantime, the detecting module 2 may be attached to the upper plate 5 to be supported by the upper plate 5.

The detecting module 2 includes a radiological image conversion panel 10 and a sensor panel 11. The radiological image conversion panel 10 includes a support 12 and a scintillator (phosphor) 13 that radiates fluorescence by the radiation exposure. The scintillator 13 is formed on the support 12.

The radiological image conversion panel 10 glues a periphery of the support 12 and a periphery of the sensor panel 11 using an flexible adhesive agent 14 in a state where a fluorescence emitting surface of the scintillator 13 that is located at an opposite side to the support 12 is closely attached and bonded to the sensor panel 11. The sensor panel 11 detects the fluorescence emitting from the scintillator 13. In the meantime, an adhesive layer is interposed between the fluorescence emitting surface of the scintillator 13 and the sensor panel 11 to optically couple both the scintillator and the sensor panel so that the bonding between the radiological image conversion panel 10 and the sensor panel 11 may be reinforced.

The adhesive agent 14 seals around each of the entire periphery of the support 12 and the sensor panel 11, and the moisture proofing of the scintillator 13 is achieved by the support 12, the sensor panel 11, and the adhesive agent 14. In the meantime, for example, if the entire radiological image conversion panel 10 is covered by the polyparaxylylene protection film to separately moisture proof the scintillator 13, the adhesive agent 14 may partially glue the periphery of the support 12 and the periphery of the sensor panel 11.

The cassette 1 is a so called surface reading (ISS: irradiation side sampling) type radiological image detection apparatus. The radiation that is incident onto the detecting module 2 penetrates the sensor panel 11 to be incident onto the scintillator 13 of the radiological image conversion panel 10. The fluorescence is generated in the scintillator 13 onto which the radiation is incident and the generated fluorescence is detected by the sensor panel 11. A radiation incident side of the scintillator 13 that generates a lot of fluorescence is provided so as to be close to the sensor panel 11, which results in improving the sensitivity.

Figure 2:
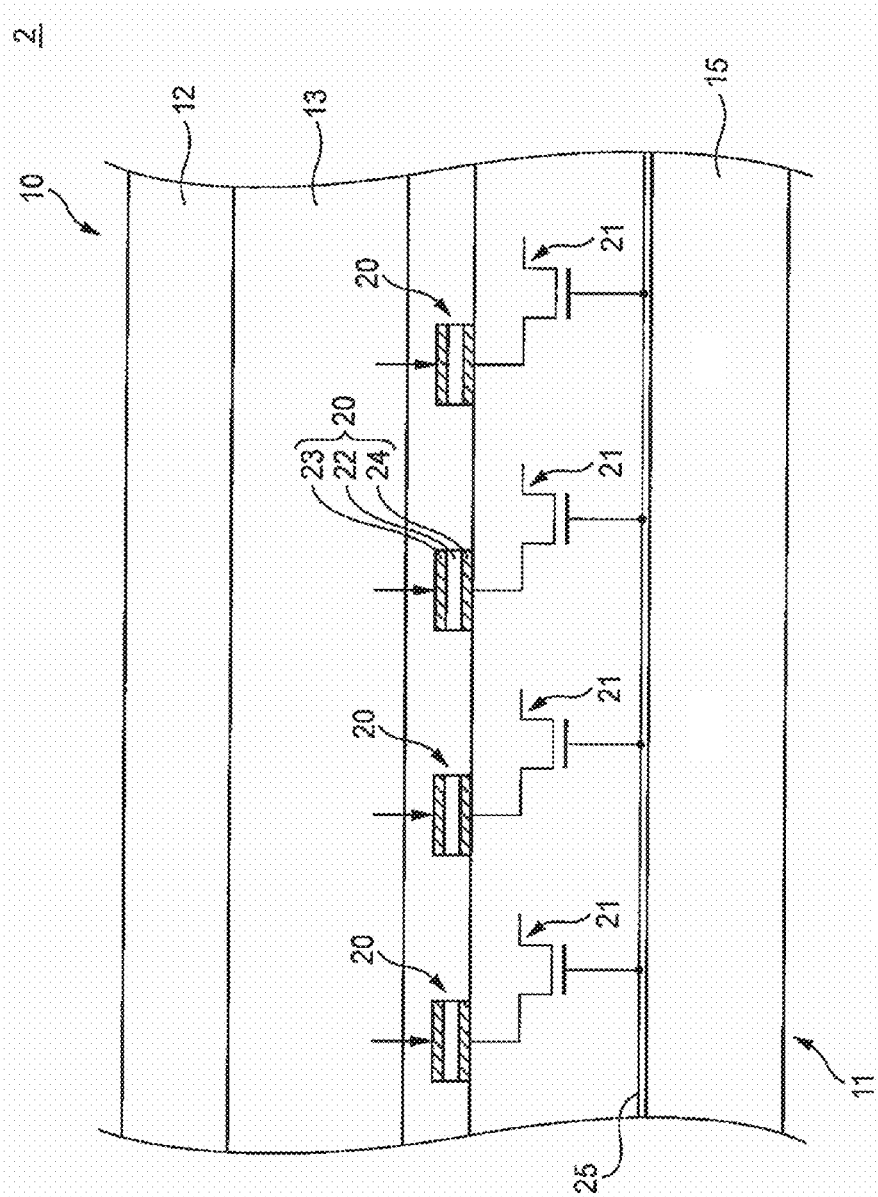
FIG. 2 is a diagram schematically illustrating the configuration of a detecting module of the radiological image detection apparatus of FIG. 1.
Figure 3:
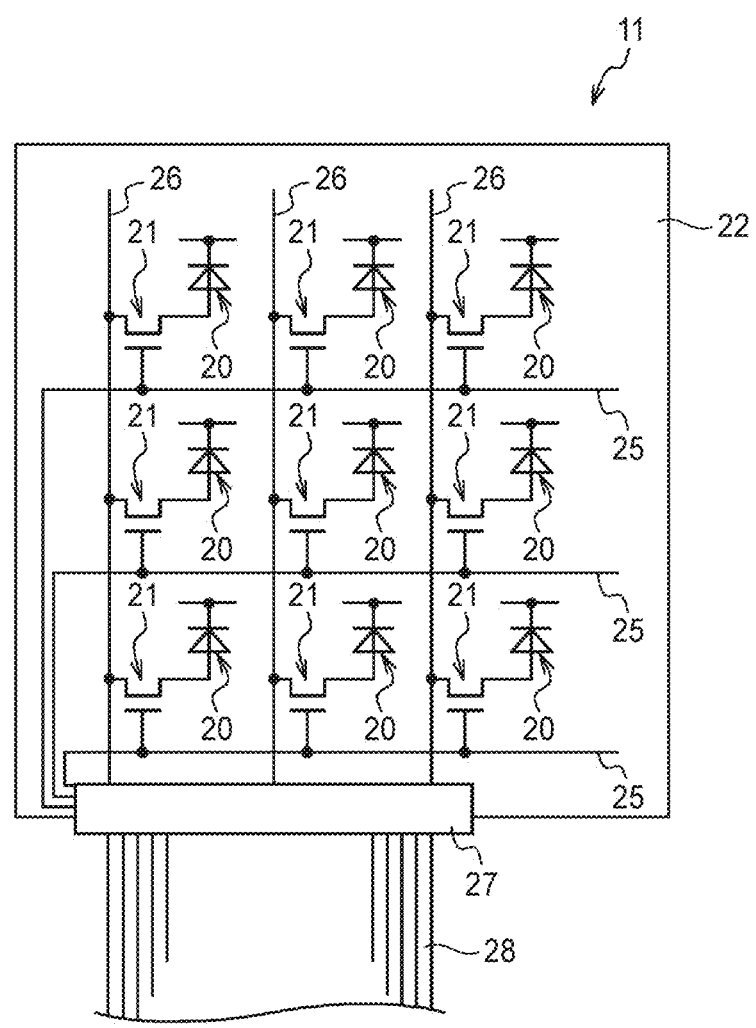
FIG. 3 is a diagram schematically illustrating the configuration of a sensor panel of the detecting module of FIG. 2.

FIGS. 2 and 3 each illustrate the configuration of the detecting module 2 of the cassette 1 and the sensor panel 11, respectively.

The sensor panel 11 includes a plurality of photoelectric conversion elements 20 and a plurality of switching devices 21 configured by thin film transistors (TFTs) for reading out charges generated in the photoelectric conversion elements 20, and an insulating substrate 15. The photoelectric conversion elements 20 and the switching devices 21 are two-dimensionally arranged on the insulating substrate 15.

In the example shown in drawings, arrays of the photoelectric conversion elements 20 and arrays of the switching devices 21 are formed on distinct layers. The arrays of the photoelectric conversion elements 20 are arranged at the scintillator 13 side. In the meantime, the arrays of the photoelectric conversion elements 20 and the arrays of the switching devices 21 may be formed on the single same layer or in the order of the arrays of the switching devices 21 and the arrays of the photoelectric conversion elements 20 from the scintillator 13 side. However, as in the example shown in drawings, the arrays of the photoelectric conversion elements 20 and the arrays of the switching devices 21 may be formed on the distinct layers to make the size of the photoelectric conversion elements 20 larger. The arrays of the photoelectric conversion elements 20 and the array of the switching devices 21 may be formed in this order from the scintillator 13 side, such that the photoelectric conversion elements 20 may be arranged to be closer to the scintillator 13, which improves the sensitivity.

The photoelectric conversion elements 20 includes a photoconductive layer 22 that receive the fluorescence of the scintillator 13 to generate charges and a pair of electrodes provided on the front and rear surfaces of the photoconductive layer 22. An electrode 23 that is provided on a surface of the photoconductive layer 22 facing the scintillator 13 is a bias electrode that applies a bias voltage to the photoconductive layer 22, and an electrode 24 that is provided on a surface located at an opposite side of the surface is a charge collecting electrode that collects charges generated in the photoconductive layer 22. The charge collecting electrode 24 of the photoelectric conversion elements 20 is connected to a corresponding switching device 21 by which the charges collected by the charge collecting electrode 24 are read out.

A plurality of gate lines 25 that extend in one direction (a row direction) and turn ON/OFF the switching devices 21 and a plurality of signal lines (data lines) 26 that extend in a direction orthogonal to the gate lines 25 (a column direction) and read out the charges by the turned-ON switching devices 21 are provided on the layer on which the arrays of the switching devices 21 are formed. A connection terminal module 27 to which individual gate lines 25 and individual signal lines 26 are connected is disposed at the periphery of the sensor panel 11. The connection terminal module 27, as shown in FIG. 2, is connected to a circuit substrate (not shown) provided in the control module 3 (see FIG. 1) through a connection circuit 28. The circuit substrate includes a gate driver and a signal processing module.

The switching devices 21 are sequentially turned ON in a row unit basis by a signal that is supplied through the gate line 25 from the gate driver. The charges that are read out by the turned-ON switching device 21 are transmitted to the signal line 26 as a charge signal to be input to the signal processing module. Therefore, the charges are sequentially read out in a row unit basis to be converted into an electrical signal in the signal processing module to generate digital image data.

Figure 4:
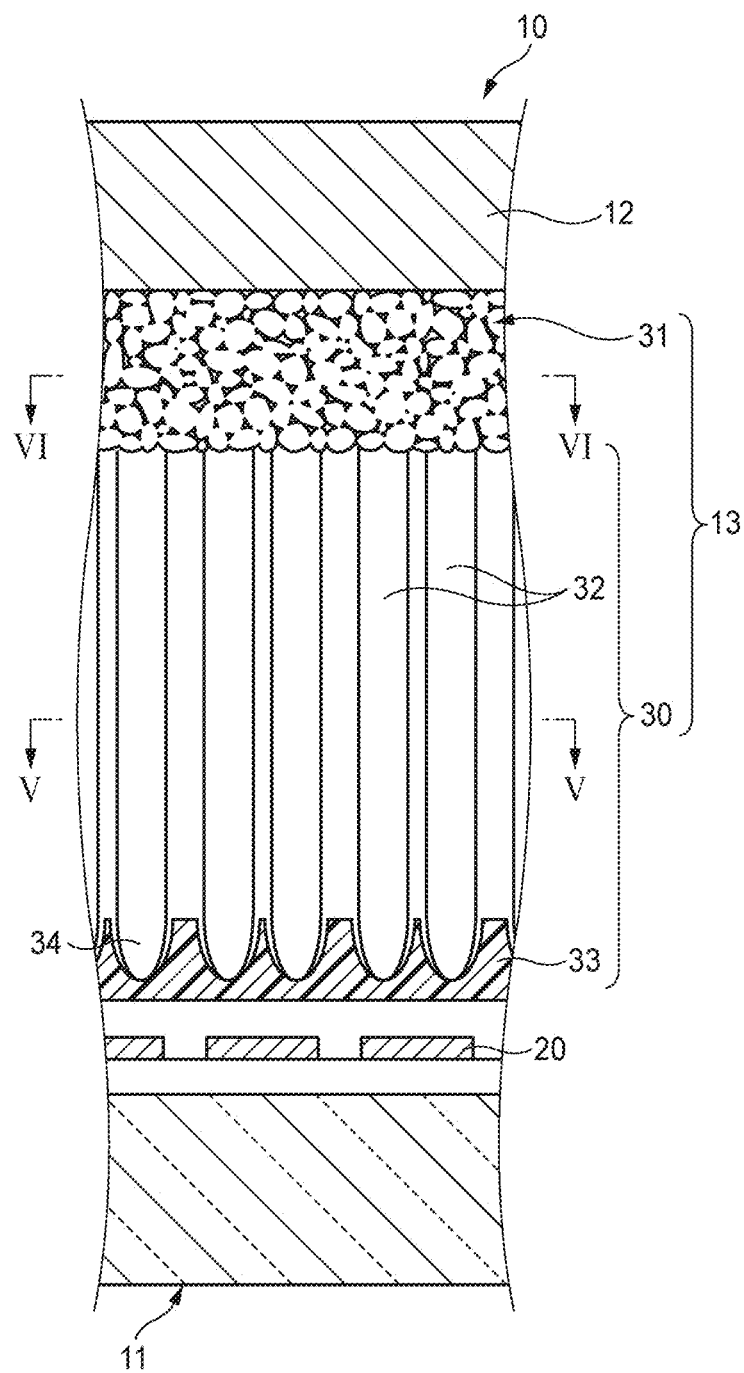
FIG. 4 is a diagram schematically illustrating the configuration of a radiological image conversion panel and a phosphor of the detecting module of FIG. 2.

FIG. 4 illustrates the configuration of a radiological image conversion panel 10 and the scintillator 13.

The support 12 is not particularly limited as long as the scintillator 13 may be formed on a support. For example, the support 12 may be formed of a carbon plate, CFRP, a glass plate, a quartz substrate, a sapphire substrate, a metal sheet selected from iron, tin, chrome, and aluminum.

The fluorescent material for forming the scintillator 13 may include thallium activated cesium iodide (CsI:Tl), thallium activated sodium iodide (NaI:Tl), or sodium activated cesium iodide (CsI:Na). Among them, CsI:Tl is preferable in that the emission spectrum is compatible with the maximum (around 550 nm) of a spectral sensitivity of an a-Si photo diode.

The scintillator 13 is constituted with a columnar portion 30 and a non-columnar portion 31. The non-columnar portion 31 and the columnar portion 30 are formed to be overlapped in sequence on the support 12. In the example shown in the drawing, the columnar portion 30 is disposed at the sensor panel 11 side that corresponds to the radiation incident side.

The non-columnar portion 31 is formed of a comparatively smaller crystal group of the fluorescence material. In the meantime, the non-columnar portion 31 may contain an amorphous member of the above-mentioned fluorescence material. The crystals are irregularly combined to each other or overlapped with each other in the non-columnar portion 31.

The columnar portion 30 is formed by a group of columnar crystals 32 in which a crystal of the above-described fluorescent material in a columnar is grown. In the meantime, a plurality of adjacent columnar crystals may be combined to form a single columnar crystal. A void is present between the adjacent columnar crystals 32 so that the columnar crystals 32 are independently present.

The fluorescence generated in the scintillator 13 by the radiation exposure is emitted from a surface (fluorescence emitting surface), that is formed by a set of tips of the columnar crystal 32, of the columnar portion 30 disposed at the sensor panel 11 side toward the sensor panel 11.

The fluorescence generated in the columnar crystal 32 repeats the total reflection in the columnar crystal 32 generated by the difference in the refractive indexes of the columnar crystal 32 and the void around the columnar crystal 32 such that the diffusion of the fluorescence is suppressed to be guided to the sensor panel 11. Therefore, the sharpness of the image is improved.

The tip of the columnar crystal 32 is formed in a convexed shape so that the light gathering efficiency becomes higher than the flatten shape or a concaved shape. Accordingly, the sharpness of the image is improved. A tip angle of the tip is preferably 40 degrees to 80 degrees.

Of the fluorescence generated in each columnar crystal 32, fluorescence traveling toward the opposite side to the sensor panel 11, that is, toward the support 12, is reflected toward the sensor panel 11 by the non-columnar portion 31. Thus, the utilization efficiency of the fluorescence is enhanced so that the sensitivity is improved.

Furthermore, the non-columnar portion 31 is denser than the columnar portion 30 and has a smaller void ratio. Due to the non-columnar portion 31 interposed between the support 12 and the columnar portion 30, the adhesion between the support 12 and the scintillator 13 is improved to prevent the scintillator 13 from being separated from the support 12.

Figure 5:
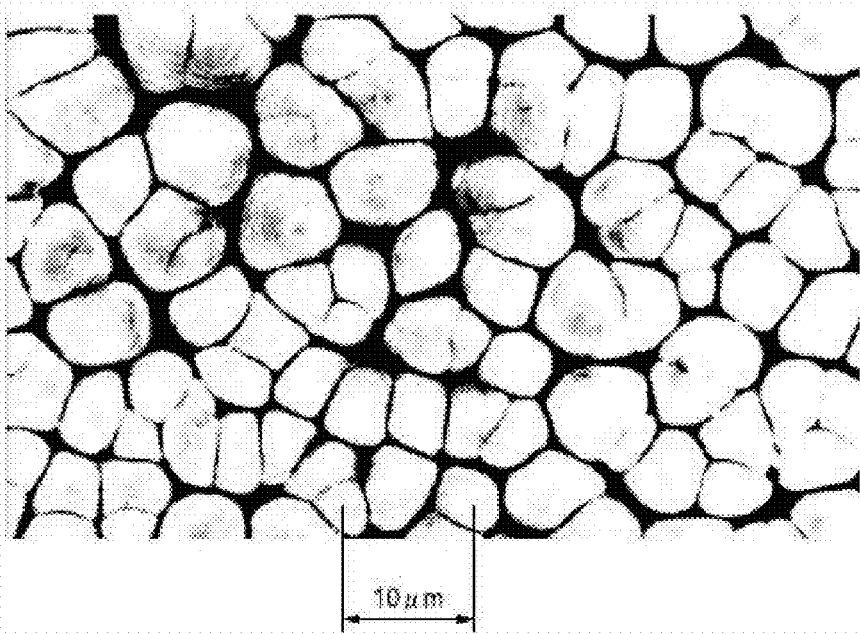
FIG. 5 is a cross-sectional view of the phosphor taken along line V-V of FIG. 4.

FIG. 5 shows an electron microscope photograph showing a section of the scintillator 13 taken on line IV-IV in FIG. 4.

As is apparent from FIG. 5, it is understood that, in the columnar portion 30, each columnar crystal 32 shows a substantially uniform sectional diameter with respect to the growth direction of the crystal, and the columnar crystals 32 exist independently of one another due to an air gap around each columnar crystal 32. It is preferable that the crystal diameter (columnar diameter) of each columnar crystal 32 is not smaller than 2 μm and not larger than 8 μm, from the viewpoints of light guide effect, mechanical strength and pixel defect prevention. When the columnar diameter is too small, each columnar crystal 32 is short of mechanical strength so that there is a fear that the columnar crystal 32 may be damaged by a shock or the like. When the crystal diameter is too large, the number of columnar crystals 32 for each image element is reduced so that there is a fear that it is highly likely that the image element may be defective when one of the crystals corresponding thereto is cracked.

Here, the crystal diameter designates the maximum diameter of a columnar crystal 32 observed from above in the growth direction of the crystal. As for a specific measurement method, the columnar diameter of each columnar crystal 32 is measured by observation in an SEM (Scanning Electron Microscope) from the growth-direction top of the columnar crystal 32. The observation is performed in the magnification (about 2,000 times) with which 100 to 200 columnar crystals 32 can be observed in each shot. The maximum values of columnar diameters of all the crystals taken in the shot are measured and averaged. An average value obtained thus is used. The columnar diameters (μm) are measured to two places of decimals, and the average value is rounded in the two places of decimals according to JIS Z 8401.

Figure 6:
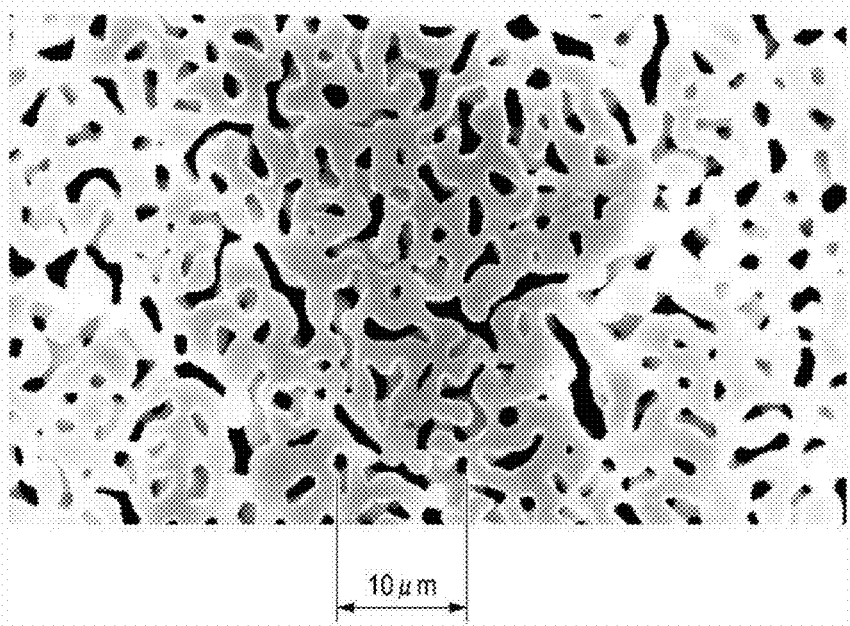
FIG. 6 is a cross-sectional view of the phosphor taken along line VI-VI of FIG. 4.

FIG. 6 shows an electron microscope photograph showing a section of the scintillator 13 taken on line V-V in FIG. 4.

As is apparent from FIG. 6, in the non-columnar portion 31, crystals are irregularly coupled or laid on one another so that no distinct air gap among the crystals can be recognized in comparison with the columnar portion 30. From the viewpoints of adhesion and optical reflection, it is preferable that the diameter of each crystal forming the non-columnar portion 31 is not smaller than 0.5 μm and not larger than 7.0 μm. When the crystal diameter is too small, the void ratio is close to zero so that there is a fear that the function of optical reflection may deteriorate. When the crystal diameter is too large, the flatness deteriorates so that there is a fear that the adhesion to the support 12 may deteriorate. In addition, from the viewpoint of optical reflection, it is preferable that the shape of each crystal forming the non-columnar portion 31 is substantially spherical.

When crystals are coupled with each other in the non-columnar portion 31, the crystal diameter of each crystal is measured as follows. That is, a line obtained by connecting recesses (concaves) generated between adjacent crystals is regarded as the boundary between the crystals. The crystals coupled with each other are separated to have minimum polygons. The columnar diameters and the crystal diameters corresponding to the columnar diameters are measured thus. An average value of the crystal diameters is obtained in the same manner as the crystal diameter in the columnar portion 30. The average value obtained thus is used as the crystal diameter in the non-columnar portion 31.

In addition, the thickness of the columnar portion 30 depends on the energy of radiation but is preferably not smaller than 200 μm and not larger than 700 μm in order to secure sufficient radiation absorption in the columnar portion 30 and sufficient image sharpness. When the thickness of the columnar portion 30 is too small, radiation cannot be absorbed sufficiently so that there is a fear that the sensitivity may deteriorate. When the thickness of the columnar portion 30 is too large, optical diffusion occurs so that there is a fear that the image sharpness may deteriorate in spite of the light guide effect of the columnar crystals 32.

It is preferable that the thickness of the non-columnar portion 31 is not smaller than 5 μm and not larger than 125 μm from the viewpoint of adhesion to the support 12 and optical reflection. When the thickness of the non-columnar portion 31 is too small, there is a fear that sufficient adhesion to the support 12 cannot be obtained. When the thickness of the non-columnar portion 31 is too large, contribution of fluorescence in the non-columnar portion 31 and diffusion caused by optical reflection in the non-columnar portion 31 increase so that there is a fear that the image sharpness may deteriorate.

The non-columnar portion 31 and the columnar portion 30 of the scintillator 13 are formed on the support 12, for example, by a vapor deposition method integrally and continuously in that order. Specifically, under the environment with a vacuum degree of 0.01 to 10 Pa, CsI:Tl is heated and evaporated by means of resistance heating crucibles to which electric power is applied. Thus, CsI:Tl is deposited on the support 12 whose temperature is set at a room temperature (20° C.) to 300° C.

At the beginning of formation of a crystal phase of CsI:Tl on the support 12, comparatively small-diameter crystals are deposited to form the non-columnar portion 31. At least one of the conditions, that is, the degree of vacuum or the temperature of the support 12 is then changed. Thus, the columnar portion 30 is formed continuously after the non-columnar portion 31 is formed. Specifically, the degree of vacuum and/or the temperature of the support 12 are increased so that a group of columnar crystals 32 are grown.

The shape (tip angle) of the tip of the columnar crystal 32 can be controlled by controlling the temperature of the support 12 at a termination period of the CsI:Tl vapor deposition. For example, the tip angle is 170 degrees at 110° C., 60 degrees at 140° C., 70 degrees at 200° C., and 120 degrees at 260° C.

In the aforementioned manner, the scintillator 13 can be manufactured efficiently and easily. In addition, according to the manufacturing method, there is another advantage that scintillators of various specifications can be manufactured easily in accordance with their designs when the degree of vacuum or the temperature of the support is controlled in formation of the scintillator 13.

The radiological image conversion panel 10 further includes a phototransmissive protection material 33 that covers the fluorescence emitting surface of the scintillator 13 configured as described above, that is, a surface formed by the set of the tips of the columnar crystal 32.

The protection material 33 is inserted between the tips of the group of the columnar crystals 32 of the columnar portion 30 to fill the gap between the tips. However, a minute void is formed between the protection material 33 and the sides of the tips of the columnar crystal 32, and the protection material 33 does not contact with the sides of the tips of the columnar crystal 32. The protection material 33 is formed so as to be inserted between the tips of the group of the columnar crystals 32 so that the protection material 33 contacts the tip surface of the columnar crystal 32 on a bottom wall of a concaved portion 34 that accommodates each of the tips of the columnar crystal 32 and is supported by the columnar crystals 32.

The protection material 33 is inserted between the tips of the group of the columnar crystals 32 of the columnar portion 30, so that deformation of the tips of the columnar crystal 32 is suppressed. Therefore, the adjacent columnar crystals 32 are prevented from being contacted with each other and the light guide effect is maintained. Since the tip is formed in a convexed shape, the high light gathering efficiency is maintained. Therefore, the sharpness of the image is prevented from being lowered.

A void is present between the protection material 33 and a side of the tip of the columnar crystal 32 so that the light guide effect caused by the total reflection generated by the difference in refractive indexes is maintained, thereby preventing the lowering of the sharpness of the image.

The tips of the group of the columnar crystals 32 are integrally formed by the protection material 33. When the radiological image conversion panel 10 and the sensor panel 11 are bonded, or when the cassette 1 is used, if a load such as a patient is applied to the cassette 1, a load is applied to the scintillator 13. In this case, since the tips of the group of the columnar crystals 32 are integrated by the protection material 33, the load is dispersed to the plurality of columnar crystals 32 to prevent the damage of the columnar crystal 32.

The depth of the concaved portion 34 of the protection material 33 that accommodates the tips of the columnar crystal 32, that is, a thickness of the protection material 33 that is inserted between the tips of the group of the columnar crystals 32 is preferably 5 μm to 30 μm from the viewpoint of suppressing the deformation of the tips of the columnar crystal 32, considering that the length of the tips that become the convexed shape of the columnar crystal 32 is normally 10 µl to 30 µm.

As a material for forming the protection material 33, an energy curable resin material having a smaller coefficient of linear expansion than a material such as CsI that forms the scintillator 13 may be used. A solution or gel of such a resin material is applied on the fluorescence emitting surface of the scintillator 13 or formed as a sheet shape to overlap the fluorescence emitting surface of the scintillator 13 to be welded onto the scintillator 13. Therefore, the resin material is filled between the tips of the group of the columnar crystals 32 and thereafter, the resin material is cured by applying energy thereto such that the above-mentioned protection material 33 is formed. When the resin material is cured, the temperature of the scintillator 13 and the resin material is raised so that a minute void may be formed between the protection material 33 and the side of the tips of the columnar crystal 32 due to the difference in the coefficients of linear expansion in the heat shrinkage by the cooling after the curing process.

Examples of an energy curable resin material include an ultraviolet ray curable resin or a thermosetting resin. Particularly, the thermosetting resin material is preferable because the thermosetting resin material may raise the temperature of the scintillator 13 and the resin material and cure the resin material at the same time. Examples of the thermosetting resin material may include a phenol resin, a urea resin, a melamine resin, an unsaturated polyester resin, an epoxy resin, or a diallyl phthalate resin. The coefficient of linear expansion of the thermosetting resin varies depending on the presence of a filling material or kinds of filling material. For example, the respective coefficient of linear expansion of the thermosetting resins are as follows: phenol resin; 8 ppm to 80 ppm, urea resin; 22 ppm to 36 ppm, melamine resin; 11 ppm to 45 ppm, epoxy resin; 11 ppm to 65 ppm, unsaturated polyester resin; 20 ppm to 100 ppm, and diallyl phthalate resin; 10 ppm to 36 ppm. When the scintillator 13 is formed of CsI, since the coefficient of linear expansion of CsI is approximately 50 ppm, a resin whose coefficient of linear expansion is 50 ppm or lower may be used among the above-mentioned resins.

When the resin material sheet is welded onto the fluorescence emitting surface of the scintillator 13, a peeling layer may be formed on a surface of the sheet that contacts with the fluorescence emitting surface. By doing so, the protection material 33 is easily peeled off from the side of the tips of the columnar crystal 32 in the thermal shrinkage by the cooling after curing process. Therefore, when the protection material 33 is peeled off, the load applied to the tips of the columnar crystal 32 is reduced. Even when the difference between the coefficients of linear expansion of the material for the scintillator 13 and the material for the protection material 33 is comparatively small, the void between the protection material 33 and the side of the tips of the columnar crystal 32 is surely formed.

As for the material for forming the peeling layer, for example, a fluorine-based resin or a silicon-based resin may be used. However, from the viewpoint of heat resistance or teratogenicity, the silicon-based resin may be appropriately used.

The fluorescence emitted from the fluorescence emitting surface of the scintillator 13 is incident onto the sensor panel 11 through the protection material 33. In this case, in order to suppress the reflection at the interface between the protection material 33 and the tips of the columnar crystal 32 contacted therewith, the refractive index of the material for forming the protection material 33 is preferably close to and lower than that of the material for forming the columnar crystal 32. For example, when the refractive index of CsI is approximately 1.8, the refractive index of the resin that forms the protection material 33 is preferably 1.5 to 1.8.

As described above, the protection material 33 is inserted between the tips of the group of the columnar crystals 32 so that the gap between the tips is filled. Therefore, the deformation of the tips of the columnar crystal 32 is suppressed, which improves the durability. Since the void is present between the protection material 33 and the sides of the tips of the columnar crystal 32, the light guide effect caused by the total reflection generated by the difference in the refractive indexes is maintained even at the tips. Therefore, the sharpness of the image is prevented from being lowered, which improves the image quality.

In the meantime, the radiation has been described to be incident from the sensor panel 11 side in the above-mentioned cassette 1. However, a configuration in which the radiation is incident from the radiological image conversion panel 10 side may be adopted.

Since the aforementioned radiological image detection apparatus can detect a radiological image with high sensitivity and high definition, it can be installed and used in an X-ray imaging apparatus for the purpose of medical diagnosis, such as a mammography apparatus, required to detect a sharp image with a low dose of radiation, and other various apparatuses. For example, the radiological image detection apparatus is applicable to an industrial X-ray imaging apparatus for nondestructive inspection, or an apparatus for detecting particle rays (α-rays, β-rays, γ-rays) other than electromagnetic waves. The radiological image detection apparatus has a wide range of applications.

Description will be made below on materials which can be used for constituent members of the sensor panel 11.

[Photoelectric Conversion Element]

Inorganic semiconductor materials such as amorphous silicon are often used for the photoconductive layer 22 (see FIG. 2) of the aforementioned photoelectric conversion elements 20. For example, any OPC (Organic Photoelectric Conversion) material disclosed in JP-A-2009-32854 may be used. A film formed out of the OPC material (hereinafter referred to as OPC film) may be used as the photoconductive layer 22. The OPC film contains an organic photoelectric conversion material, absorbing light emitted from a phosphor and generating electric charges in accordance with the absorbed light. Such an OPC film containing an organic photoelectric conversion material has a sharp absorption spectrum in a visible light range. Thus, electromagnetic waves other than light emitted from the phosphor are hardly absorbed by the OPC film, but noise generated by radiation such as X-rays absorbed by the OPC film can be suppressed effectively.

It is preferable that the absorption peak wavelength of the organic photoelectric conversion material forming the OPC film is closer to the peak wavelength of light emitted by the phosphor in order to more efficiently absorb the light emitted by the phosphor. Ideally, the absorption peak wavelength of the organic photoelectric conversion material agrees with the peak wavelength of the light emitted by the phosphor. However, if the difference between the absorption peak wavelength of the organic photoelectric conversion material and the peak wavelength of the light emitted by the phosphor is small, the light emitted by the phosphor can be absorbed satisfactorily. Specifically, the difference between the absorption peak wavelength of the organic photoelectric conversion material and the peak wavelength of the light emitted by the phosphor in response to radioactive rays is preferably not larger than 10 nm, more preferably not larger than 5 nm.

Examples of the organic photoelectric conversion material that can satisfy such conditions include arylidene-based organic compounds, quinacridone-based organic compounds, and phthalocyanine-based organic compounds. For example, the absorption peak wavelength of quinacridone in a visible light range is 560 nm. Therefore, when quinacridone is used as the organic photoelectric conversion material and CsI(Tl) is used as the phosphor material, the aforementioned difference in peak wavelength can be set within 5 nm so that the amount of electric charges generated in the OPC film can be increased substantially to the maximum.

At least a part of an organic layer provided between the bias electrode 23 and the charge collection electrode 24 can be formed out of an OPC film. More specifically, the organic layer can be formed out of a stack or a mixture of a portion for absorbing electromagnetic waves, a photoelectric conversion portion, an electron transport portion, an electron hole transport portion, an electron blocking portion, an electron hole blocking portion, a crystallization prevention portion, electrodes, interlayer contact improvement portions, etc.

Preferably the organic layer contains an organic p-type compound or an organic n-type compound. An organic p-type semiconductor (compound) is a donor-type organic semiconductor (compound) as chiefly represented by an electron hole transport organic compound, meaning an organic compound having characteristic to easily donate electrons. More in detail, of two organic materials used in contact with each other, one with lower ionization potential is called the donor-type organic compound. Therefore, any organic compound may be used as the donor-type organic compound as long as the organic compound having characteristic to donate electrons. Examples of the donor-type organic compound that can be used include a triarylamine compound, a benzidine compound, a pyrazoline compound, a styrylamine compound, a hydrazone compound, a triphenylmethane compound, a carbazole compound, a polysilane compound, a thiophene compound, a phthalocyanine compound, a cyanine compound, a merocyanine compound, an oxonol compound, a polyamine compound, an indole compound, a pyrrole compound, a pyrazole compound, a polyarylene compound, a fused aromatic carbocyclic compound (naphthalene derivative, anthracene derivative, phenanthrene derivative, tetracene derivative, pyrene derivative, perylene derivative, fluoranthene derivative), a metal complex having a nitrogen-containing heterocyclic compound as a ligand, etc. The donor-type organic semiconductor is not limited thereto but any organic compound having lower ionization potential than the organic compound used as an n-type (acceptor-type) compound may be used as the donor-type organic semiconductor.

The n-type organic semiconductor (compound) is an acceptor-type organic semiconductor (compound) as chiefly represented by an electron transport organic compound, meaning an organic compound having characteristic to easily accept electrons. More specifically, when two organic compounds are used in contact with each other, one of the two organic compounds with higher electron affinity is the acceptor-type organic compound. Therefore, any organic compound may be used as the acceptor-type organic compound as long as the organic compound having characteristic to accept electrons. Examples thereof include a fused aromatic carbocyclic compound (naphthalene derivative, anthracene derivative, phenanthrene derivative, tetracene derivative, pyrene derivative, perylene derivative, fluoranthene derivative), a 5- to 7-membered heterocyclic compound containing a nitrogen atom, an oxygen atom or a sulfur atom (e.g. pyridine, pyrazine, pyrimidine, pyridazine, triazine, quinoline, quinoxaline, quinazoline, phthalazine, cinnoline, isoquinoline, pteridine, acridine, phenazine, phenanthroline, tetrazole, pyrazole, imidazole, thiazole, oxazole, indazole, benzimidazole, benzotriazole, benzoxazole, benzothiazole, carbazole, purine, triazolopyridazine, triazolopyrimidine, tetrazaindene, oxadiazole, imidazopyridine, pyralidine, pyrrolopyridine, thiadiazolopyridine, dibenzazepine, tribenzazepine etc.), a polyarylene compound, a fluorene compound, a cyclopentadiene compound, a silyl compound, and a metal complex having a nitrogen-containing heterocyclic compound as a ligand. The acceptor-type organic semiconductor is not limited thereto. Any organic compound may be used as the acceptor-type organic semiconductor as long as the organic compound has higher electron affinity than the organic compound used as the donor-type organic compound.

As for p-type organic dye or n-type organic dye, any known dye may be used. Preferred examples thereof include cyanine dyes, styryl dyes, hemicyanine dyes, merocyanine dyes (including zero-methine merocyanine (simple merocyanine)), trinuclear merocyanine dyes, tetranuclear merocyanine dyes, rhodacyanine dyes, complex cyanine dyes, complex merocyanine dyes, alopolar dyes, oxonol dyes, hemioxonol dyes, squarylium dyes, croconium dyes, azamethine dyes, coumarin dyes, arylidene dyes, anthraquinone dyes, triphenylmethane dyes, azo dyes, azomethine dyes, Spiro compounds, metallocene dyes, fluorenone dyes, flugide dyes, perylene dyes, phenazine dyes, phenothiazine dyes, quinone dyes, indigo dyes, diphenylmethane dyes, polyene dyes, acridine dyes, acridinone dyes, diphenylamine dyes, quinacridone dyes, quinophthalone dyes, phenoxazine dyes, phthaloperylene dyes, porphyrin dyes, chlorophyll dyes, phthalocyanine dyes, metal complex dyes, and fused aromatic carbocyclic dyes (naphthalene derivative, anthracene derivative, phenanthrene derivative, tetracene derivative, pyrene derivative, perylene derivative, fluoranthene derivative).

A photoelectric conversion film (photosensitive layer) which has a layer of a p-type semiconductor and a layer of an n-type semiconductor between a pair of electrodes and at least one of the p-type semiconductor and the n-type semiconductor is an organic semiconductor and in which a bulk heterojunction structure layer including the p-type semiconductor and the n-type semiconductor is provided as an intermediate layer between those semiconductor layers may be used preferably. The bulk heterojunction structure layer included in the photoelectric conversion film can cover the defect that the carrier diffusion length of the organic layer is short. Thus, the photoelectric conversion efficiency can be improved. The bulk heterojunction structure has been described in detail in JP-A-2005-303266.

It is preferable that the photoelectric conversion film is thicker in view of absorption of light from the phosphor layer. The photoelectric conversion film is preferably not thinner than 30 nm and not thicker than 300 nm, more preferably not thinner than 50 nm and not thicker than 250 nm, particularly more preferably not thinner than 80 nm and not thicker than 200 nm in consideration of the ratio which does make any contribution to separation of electric charges.

As for any other configuration about the aforementioned OPC film, for example, refer to description in JP-A-2009-32854.

[Switching Device]

Inorganic semiconductor materials such as amorphous silicon are often used for an active layer of each switching device 21. However, any organic material, for example, as disclosed in JP-A-2009-212389, may be used. Although the organic TFT may have any type of structure, a field effect transistor (FET) structure is the most preferable. In the FET structure, a gate electrode is provided on a part of an upper surface of an insulating substrate, and an insulator layer is provided to cover the electrode and touch the substrate in the other portion than the electrode. Further, a semiconductor active layer is provided on an upper surface of the insulator layer, and a transparent source electrode and a transparent drain electrode are disposed on a part of an upper surface of the semiconductor active layer and at a distance from each other. This configuration is called a top contact type device. However, a bottom contact type device in which a source electrode and a drain electrode are disposed under a semiconductor active layer may be also used preferably. In addition, a vertical transistor structure in which a carrier flows in the thickness direction of an organic semiconductor film may be used.

(Active Layer)

Organic semiconductor materials mentioned herein are organic materials showing properties as semiconductors. Examples of the organic semiconductor materials include p-type organic semiconductor materials (or referred to as p-type materials simply or as electron hole transport materials) which conduct electron holes (holes) as carriers, and n-type organic semiconductor materials (or referred to as n-type materials simply or as electrode transport materials) which conduct electrons as carriers, similarly to a semiconductor formed out of an inorganic material. Of the organic semiconductor materials, lots of p-type materials generally show good properties. In addition, p-type transistors are generally excellent in operating stability as transistors under the atmosphere. Here, description here will be made on a p-type organic semiconductor material.

One of properties of organic thin film transistors is a carrier mobility (also referred to as mobility simply) μ which indicates the mobility of a carrier in an organic semiconductor layer. Although preferred mobility varies in accordance with applications, higher mobility is generally preferred. The mobility is preferably not lower than $1.0*10^{-7}$ cm$^2$/Vs, more preferably not lower than $1.0*10^{-6}$ cm$^2$/Vs, further preferably not lower than $1.0*10^{-5}$ cm$^2$/Vs. The mobility can be obtained by properties or TOF (Time Of Flight) measurement when the field effect transistor (FET) device is manufactured.

The p-type organic semiconductor material may be either a low molecular weight material or a high molecular weight material, but preferably a low molecular weight material. Lots of low molecular weight materials typically show excellent properties due to easiness in high purification because various refining processes such as sublimation refining, recrystallization, column chromatography, etc. can be applied thereto, or due to easiness in formation of a highly ordered crystal structure because the low molecular weight materials have a fixed molecular structure. The molecular weight of the low molecular weight material is preferably not lower than 100 and not higher than 5,000, more preferably not lower than 150 and not higher than 3,000, further more preferably not lower than 200 and not higher than 2,000.

A phthalocyanine compound or a naphthalocyanine compound may be exemplified as such a p-type organic semiconductor material. A specific example thereof is shown as follows. M represents a metal atom, Bu represents a butyl group, Pr represents a propyl group, Et represents an ethyl group, and Ph represents a phenyl group.

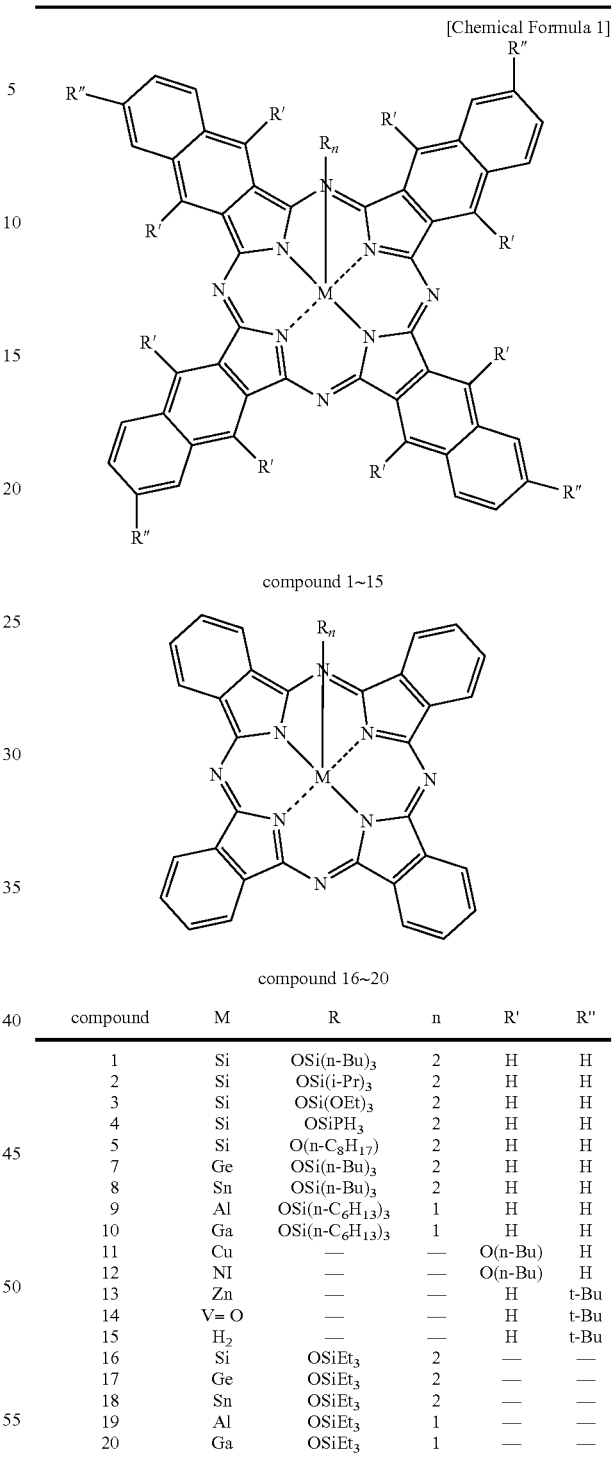

[Chemical Formula 1]

compound 1~15 compound 16~20

| compound | M | R | n | R' | R" |
|---|---|---|---|---|---|
| 1 | Si | OSi(n-Bu)$_3$ | 2 | H | H |
| 2 | Si | OSi(i-Pr)$_3$ | 2 | H | H |
| 3 | Si | OSi(OEt)$_3$ | 2 | H | H |
| 4 | Si | OSiPH$_3$ | 2 | H | H |
| 5 | Si | O(n-C$_8$H$_{17}$) | 2 | H | H |
| 7 | Ge | OSi(n-Bu)$_3$ | 2 | H | H |
| 8 | Sn | OSi(n-Bu)$_3$ | 2 | H | H |
| 9 | Al | OSi(n-C$_6$H$_{13}$)$_3$ | 1 | H | H |
| 10 | Ga | OSi(n-C$_6$H$_{13}$)$_3$ | 1 | H | H |
| 11 | Cu | — | — | O(n-Bu) | H |
| 12 | NI | — | — | O(n-Bu) | H |
| 13 | Zn | — | — | H | t-Bu |
| 14 | V=O | — | — | H | t-Bu |
| 15 | H$_2$ | — | — | H | t-Bu |
| 16 | Si | OSiEt$_3$ | 2 | — | — |
| 17 | Ge | OSiEt$_3$ | 2 | — | — |
| 18 | Sn | OSiEt$_3$ | 2 | — | — |
| 19 | Al | OSiEt$_3$ | 1 | — | — |
| 20 | Ga | OSiEt$_3$ | 1 | — | — |

(Constituent Members of Switching Device Other than Active Layer)

The material forming the gate electrode, the source electrode or the drain electrode is not limited particularly if it has required electric conductivity. Examples thereof include: transparent electrically conductive oxides such as ITO (indium-doped tin oxide), IZO (indium-doped zinc oxide), SnO$_2$, ATO (antimony-doped tin oxide), ZnO, AZO (aluminum-doped zinc oxide), GZO (gallium-doped zinc oxide), TiO$_2$, FTO (fluorine-doped tin oxide), etc.; transparent electrically conductive polymers such as PEDOT/PSS (poly(3,4-ethylenedioxythiophene)/polystyrenesulfonate); carbon materials such as carbon nanotube; etc. These electrode materials may be formed into films, for example, by a vacuum deposition method, sputtering, a solution application method, etc.

The material used for the insulating layer is not limited particularly as long as it has required insulating effect. Examples thereof include: inorganic materials such as silicon dioxide, silicon nitride, alumina, etc.; and organic materials such as polyester (PEN (polyethylene naphthalate), PET (polyethylene terephthalate) etc.), polycarbonate, polyimide, polyamide, polyacrylate, epoxy resin, polyparaxylylene resin, novolak resin, PVA (polyvinyl alcohol), PS (polystyrene), etc. These insulating film materials may be formed into films, for example, by a vacuum deposition method, sputtering, a solution application method, etc.

As for any other configuration about the aforementioned organic TFT, for example, refer to the description in JP-A-2009-212389.

In addition, for example, amorphous oxide disclosed in JP-A-2010-186860 may be used for the active layer of the switching devices 21. Here, description will be made on an amorphous oxide containing active layer belonging to an FET transistor disclosed in JP-A-2010-186860. The active layer serves as a channel layer of the FET transistor where electrons or holes can move.

The active layer is configured to contain an amorphous oxide semiconductor. The amorphous oxide semiconductor can be formed into a film at a low temperature. Thus, the amorphous oxide semiconductor can be formed preferably on a flexible substrate. The amorphous oxide semiconductor used for the active layer is preferably of amorphous oxide containing at least one kind of element selected from a group consisting of In, Sn, Zn and Cd, more preferably of amorphous oxide containing at least one kind of element selected from a group consisting of In, Sn and Zn, further preferably of amorphous oxide containing at least one kind of element selected from a group consisting of In and Zn.

Specific examples of the amorphous oxide used for the active layer include $In_2O_3$, ZnO, $SnO_2$, CdO, Indium-Zinc-Oxide (IZO), Indium-Tin-Oxide (ITO), Gallium-Zinc-Oxide (GZO), Indium-Gallium-Oxide (IGO), and Indium-Gallium-Zinc-Oxide (IGZO).

It is preferable that a vapor phase film formation method targeting at a polycrystal sinter of the oxide semiconductor is used as a method for forming the active layer. Of vapor phase film formation methods, a sputtering method or a pulse laser deposition (PLD) method is suitable. Further, the sputtering method is preferred in view from mass productivity. For example, the active layer is formed by an RF magnetron sputtering deposition method with a controlled degree of vacuum and a controlled flow rate of oxygen.

By a known X-ray diffraction method, it can be confirmed that the active layer formed into a film is an amorphous film. The composition ratio of the active layer is obtained by an RBS (Rutherford Backscattering Spectrometry) method.

In addition, the electric conductivity of the active layer is preferably lower than $10^2$ $Scm^{-1}$ and not lower than $10^{-4}$ $Scm^{-1}$, more preferably lower than $10^2$ $Scm^{-1}$ and not lower than $10^{-1}$ $Scm^{-1}$. Examples of the method for adjusting the electric conductivity of the active layer include an adjusting method using oxygen deficiency, an adjusting method using a composition ratio, an adjusting method using impurities, and an adjusting method using an oxide semiconductor material, as known.

As for any other configuration about the aforementioned amorphous oxide, for example, refer to description in JP-A-2010-186860.

As described above, the present specification discloses a radiological image conversion panel in the following (1) to (8), a manufacturing method of a radiological image conversion panel in the following (9), and a radiological image detection apparatus in the following (10) and (11).

(1) A radiological image conversion panel includes a phosphor and a light transmissive protection material. The phosphor includes a group of columnar crystals and a fluorescence emitting surface. The columnar crystal is formed by growing a crystal of a fluorescent material which emits fluorescence in a columnar by a radiation exposure. The fluorescence emitting surface is configured by a set of tips of the columnar crystals. The light transmissive protection material covers the fluorescence emitting surface of the phosphor. The protection material is inserted between the tips of the group of the columnar crystals. A gap is formed between at least a part of a side of the tips of the columnar crystals and the protection material.

(2) The radiological image conversion panel of (1), a coefficient of linear expansion of the protection material is smaller than a coefficient of linear expansion of the fluorescent material.

(3) The radiological image conversion panel of (1) or (2), the protection material is made of a thermosetting resin.

(4) The radiological image conversion panel of (3), the thermosetting resin is selected from a group consisting of a phenol resin, a urea resin, a melamine resin, an unsaturated polyester resin, an epoxy resin, and a diallyl phthalate resin.

(5) The radiological image conversion panel of (3) or (4), the protection material is formed as a sheet type and welded onto the fluorescence emitting surface of the phosphor.

(6) The radiological image conversion panel of (5), in the protection material, a peeling layer is formed on a surface which contacts with the fluorescence emitting surface of the phosphor.

(7) The radiological image conversion panel of (6), the peeling layer is formed of a fluorine-based resin or silicon-based resin.

(8) The radiological image conversion panel of (1), the tips of the columnar crystals are convex shapes.

(9) A manufacturing method for a radiological image conversion panel that includes a phosphor having a group of columnar crystals formed by growing a crystal of a fluorescent material which emits fluorescence in a columnar by a radiation exposure and including a fluorescence emitting surface configured by a set of tips of the columnar crystals, the method including: heating the phosphor; covering the fluorescence emitting surface of the heated phosphor with a protection material having a smaller coefficient of linear expansion than a coefficient of linear expansion of the fluorescent material to harden the protection material in a state where the tips of the columnar crystal are inserted in the protection material; and cooling the phosphor and the protection material after hardening the protection material.

(10) A radiological image detection apparatus includes a radiological image conversion panel of any one of (1) to (8), and a sensor panel. The sensor panel is provided closely attached to the fluorescence emitting surface of the phosphor to detect the fluorescence emitted from the phosphor.

(11) The radiological image detection apparatus of (10), the radiation penetrates the sensor panel and then is incident on the radiological image conversion panel.

(12) The radiological image conversion panel of (1), the protection material includes concaved portions which accommodate each of the tips of the columnar crystals. The gap is formed between each of the tips of the columnar crystals and each of the concaved portions of the protection material.

(13) The radiological image conversion panel of (8), the protection material includes concaved portions which accommodate each of the tips of the columnar crystals having the convex shapes. The gap is formed between each of the tips of the columnar crystals having the convex shapes and each of the concaved portions of the protection material.

(14) The radiological image conversion panel of (1), wherein the phosphor includes thallium activated cesium iodide.

What is claimed is:

1. A radiological image conversion panel, comprising:
a phosphor that has a group of columnar crystals formed by growing a crystal of a fluorescent material which emits fluorescence in a columnar by a radiation exposure and that includes a fluorescence emitting surface configured by a set of tips of the columnar crystals; and
a light transmissive protection material that covers the fluorescence emitting surface of the phosphor,
wherein the protection material is inserted between the tips of the group of the columnar crystals, and
a gap is formed between at least a part of a side of the tips of the columnar crystals and the protection material.

2. The radiological image conversion panel of claim 1, wherein a coefficient of linear expansion of the protection material is smaller than a coefficient of linear expansion of the fluorescent material.

3. The radiological image conversion panel of claim 1, wherein the protection material is made of a thermosetting resin.

4. The radiological image conversion panel of claim 3, wherein the thermosetting resin is selected from a group consisting of a phenol resin, a urea resin, a melamine resin, an unsaturated polyester resin, an epoxy resin, and a diallyl phthalate resin.

5. The radiological image conversion panel of claim 3, wherein the protection material is formed as a sheet type, and welded onto the fluorescence emitting surface of the phosphor.

6. The radiological image conversion panel of claim 5, wherein in the protection material, a peeling layer is formed on a surface which contacts with the fluorescence emitting surface of the phosphor.

7. The radiological image conversion panel of claim 6, wherein the peeling layer is formed of a fluorine-based resin or silicon-based resin.

8. The radiological image conversion panel of claim 1, wherein the tips of the columnar crystals are convex shapes.

9. A radiological image detection apparatus, comprising:
a radiological image conversion panel of claim 1, and
a sensor panel that is provided closely attached to the fluorescence emitting surface of the phosphor to detect the fluorescence emitted from the phosphor.

10. The radiological image detection apparatus of claim 9, wherein the radiation penetrates the sensor panel and then is incident on the radiological image conversion panel.

11. The radiological image conversion panel of claim 1, wherein the protection material includes concaved portions which accommodate each of the tips of the columnar crystals, and
the gap is formed between each of the tips of the columnar crystals and each of the concaved portions of the protection material.

12. The radiological image conversion panel of claim 8, wherein the protection material includes concaved portions which accommodate each of the tips of the columnar crystals having the convex shapes, and
the gap is formed between each of the tips of the columnar crystals having the convex shapes and each of the concaved portions of the protection material.

13. The radiological image conversion panel of claim 1, wherein the phosphor includes thallium activated cesium iodide.

14. A radiological image detection apparatus comprising:
a radiological image conversion panel of claim 1; and
a sensor panel that is bonded to the fluorescence emitting surface of the phosphor to detect the fluorescence emitted from the phosphor.

15. The radiological image conversion panel of claim 1, wherein the tips of the columnar crystals are integrated by the protection material.

16. A manufacturing method for a radiological image conversion panel that includes a phosphor having a group of columnar crystals formed by growing a crystal of a fluorescent material which emits fluorescence in a columnar by a radiation exposure and including a fluorescence emitting surface configured by a set of tips of the columnar crystals, the method comprising—
heating the phosphor;
covering the fluorescence emitting surface of the heated phosphor with a protection material having a smaller coefficient of linear expansion than a coefficient of linear expansion of the fluorescent material to harden the protection material in a state where the tips of the columnar crystal are inserted in the protection material;
cooling the phosphor and the protection material after hardening the protection material
wherein the protection material includes concaved portions which accommodate each of the tips of the columnar crystals,
wherein a gap is formed between each of the tips of the columnar crystals and each of the concaved portions of the protection material, and
wherein the gap is formed by cooling.

17. The manufacturing method for a radiological image conversion panel of claim 16, wherein the tips of the columnar crystals are integrated by the protection material.

* * * * *